United States Patent [19]

Thorne

[11] 4,304,739
[45] Dec. 8, 1981

[54] AIR CLEANERS

[76] Inventor: John Thorne, Kingswood House, Main St., Woodhouse Eaves, Rothely, Leicestershire, England

[21] Appl. No.: 141,079
[22] PCT Filed: Apr. 2, 1979
[86] PCT No.: PCT/GB79/00057
   § 371 Date: Dec. 6, 1979
   § 102(e) Date: Dec. 6, 1979
[87] PCT Pub. No.: WO79/00889
   PCT Pub. Date: Nov. 1, 1979

[30] Foreign Application Priority Data
   Apr. 6, 1978 [GB] United Kingdom ............... 13440/78

[51] Int. Cl.$^3$ ........................................... B01D 47/02
[52] U.S. Cl. ..................................... 261/120; 55/249
[58] Field of Search ................. 55/244, 249, 255, 256; 261/119 R, 120

[56] References Cited

U.S. PATENT DOCUMENTS

| | | | |
|---|---|---|---|
| 773,784 | 11/1904 | Bronck | 261/119 R |
| 1,064,102 | 6/1913 | Smith et al. | 261/120 |
| 1,447,336 | 3/1923 | Baughman | 261/120 |
| 3,618,298 | 11/1971 | Curchod | 261/119 R |
| 4,182,617 | 1/1980 | Al-Saidi | 55/256 |
| 4,224,042 | 9/1980 | Garigioli | 55/255 |

FOREIGN PATENT DOCUMENTS

| | | | |
|---|---|---|---|
| 523204 | 10/1953 | Belgium | 55/249 |
| 1200995 | 9/1965 | Fed. Rep. of Germany | 261/120 |
| 1006412 | 1/1948 | France | 55/256 |
| 1037789 | 8/1966 | United Kingdom . | |

*Primary Examiner*—David L. Lacey
*Attorney, Agent, or Firm*—Wheeler, House, Fuller & Hohenfeldt

[57] ABSTRACT

An air cleaner suitable for vehicles, ships, mines and tunnels has a tank for cleaning liquid, an extensible or flexible feed tube for air, and means for maintaining the outlet of the feed tube at the level of the cleaning liquid. The outlet is preferably floated on the cleaning liquid, rounded or circular in plan view, divided into chambers and provided with a depending skirt with an indented edge to help in maintaining the outlet upright by allowing the escape of gas and its exchange between compartments. More than one air feed tube may be provided.

5 Claims, 6 Drawing Figures

AIR CLEANERS

DESCRIPTION

The invention relates to air cleaners, wet dust-extraction units, or self-induced spray scrubbers.

BACKGROUND ART

The invention is an improvement on the air cleaners described in our British Patent Specification No. 1,037,789.

The air cleaners described in our earlier Patent Specification work very well provided that the water level is maintained, and the apparatus is level. Otherwise, air escapes cleaning or has to be forced through an unnecessary amount of water. These limitations limit usefulness in vehicles, ships, mines and tunnels.

DISCLOSURE OF INVENTION

An air cleaner according to the invention comprises a tank for cleaning liquid, an extensible or flexible feed tube for air, and an outlet at the end of the feed tube including means for maintaining the outlet at the level of the cleaning liquid. This makes it possible for the cleaner to be used with various levels of cleaning liquid and when the cleaner itself is not level.

The means for maintaining the outlet level is preferably means for floating the outlet at the surface of the cleaning liquid. In use, the liquid surface tends to be depressed by the feed air forming a supporting cushion, and there is some turbulence, but the outlet can be maintained substantially at the level of the liquid surface. The pressure of feed air tends to lift the outlet of the water, so the outlet should be made reasonably heavy.

The outlet may be provided with floats, guides with reference to the inside of the tank, dampers to mitigate buffetting by the motion of the cleaning liquid, and/or baffles to reduce carry over of liquid out of the tank. These may be attached to the outlet, to the inside of the tank, or independent.

The outlet is preferably rounded or circular rather than long and thin in plan view. The space under the outlet is preferably divided into separate chambers in such a way that a change in pressure in one chamber (due for instances to tilting of the outlet) has minimal effect upon the pressure in the other chambers. A similar effect can be achieved by providing two or more extensible feed tubes, possibly connected together or indpendent. The outlet may be provided around the edge with a skirt for depending into the liquid, and the skirt is preferably provided with an intended edge. Each of these modifications tends to reduce the pressure under the outlet if part of the edge of the outlet should rise relative to the surface of the cleaning liquid, and this induces a righting moment to stabilize the outlet over the liquid.

BEST MODE OF CARRYING OUT THE INVENTION

Figure 1:
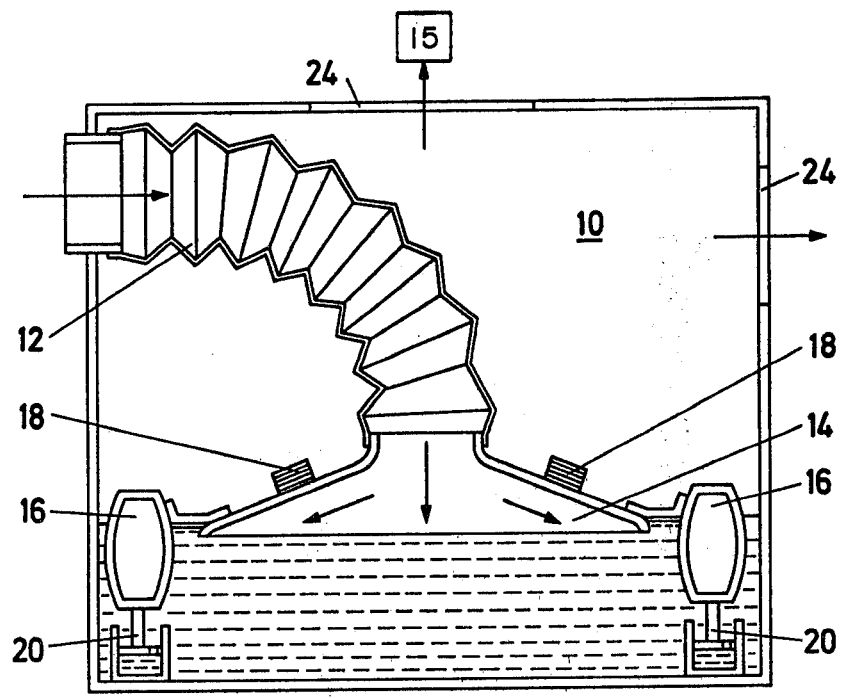
FIG. 1 is a vertical section through an air cleaner.
Figure 2:
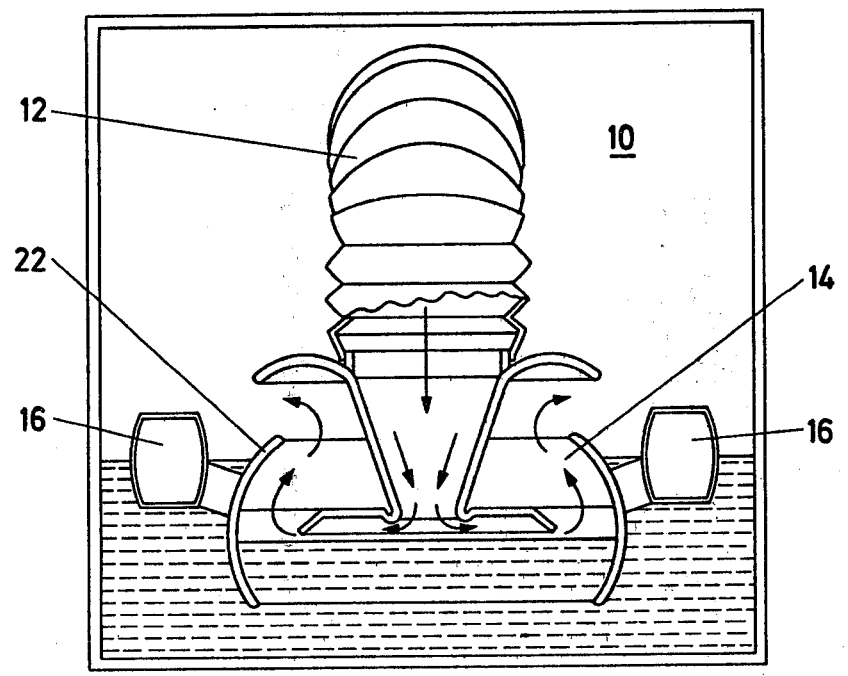
FIG. 2 is a vertical section perpendicular to that of FIG. 1 and including a modified outlet.

In FIGS. 1 and 2 the cleaner comprises a chamber 10 having a tank of cleaning liquid as its lower part. An extensible feed tube 12 for air enters at one side of the chamber, and ends with an outlet 14. Air is drawn through feed tube 12 by a fan 15. The outlet 14 is provided with floats 16, weights 18, hydraulic dampers 20 which also function as guides for the outlet in the tank by preventing horizontal movement of the outlet, and baffles 22. Air is exhausted from the chamber through outlets 24.

Figure 3:
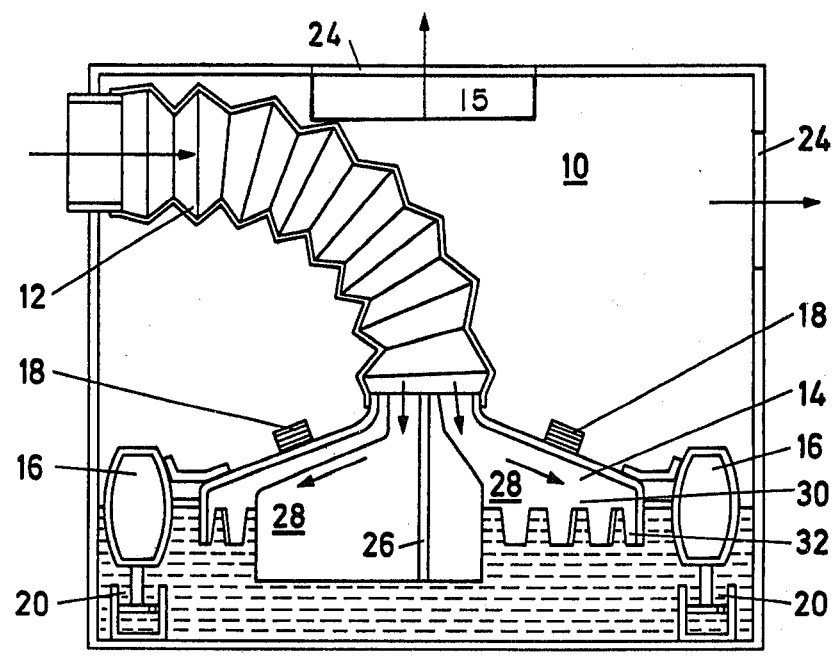
FIG. 3 is a vertical section through a modified air cleaner.
Figure 4:
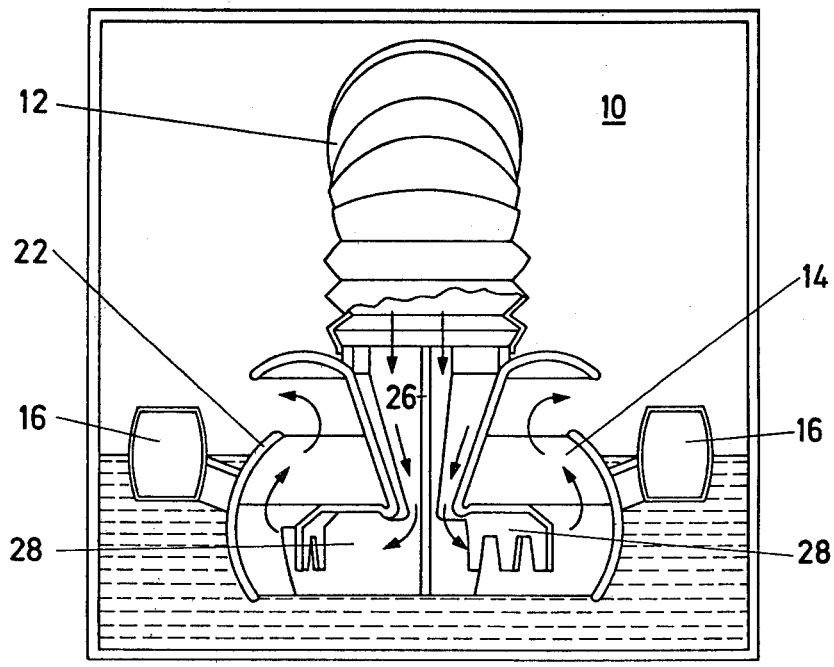
FIG. 4 is a vertical section perpendicular to that of FIG. 3 and including a modified outlet.

FIGS. 3 and 4 are very similar to FIGS. 1 and 2, but the space under the outlet 14 is divided by sheets 26 into separate chambers 28. The outlet 14 is provided around the edge with a skirt 30 indented with "dogs teeth" 32.

Figure 5:
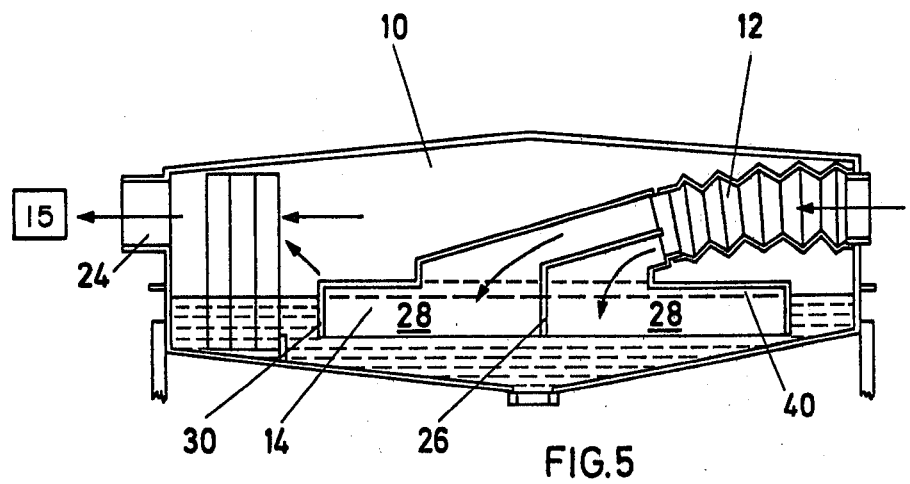
FIG. 5 is a vertical section through another air cleaner.
Figure 6:
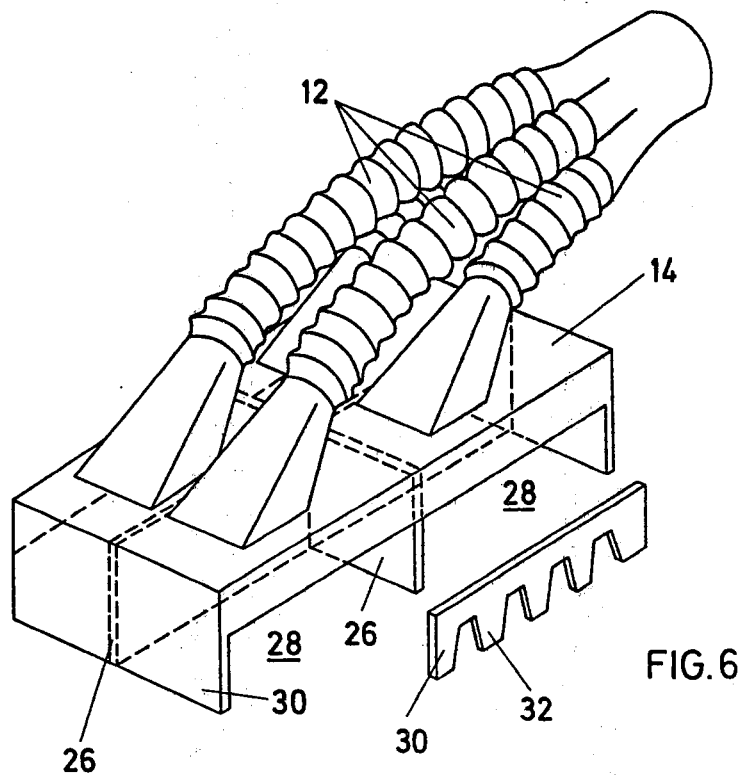
FIG. 6 is an isometric view of a further modified outlet of the feed tube.

In FIGS. 5 and 6 also the same reference numerals have been used to indicate corresponding parts. In FIG. 6, the feed tube 12 is quadrupled, and each branch leads to a separate chamber 28 divided off from the others by sheets 26 and surrounded by a skirt 30. The outlet 14 is box shaped.

INDUSTRIAL APPLICABILITY

An air cleaner according to the invention can be used for removing dust from the atmosphere, for example at the coal face. Air is drawn through by the fan 15 at the outlet, and leaves the entrained dust in the liquid. On installation and prior to use, the cleaning liquid is preferably levelled within the chamber so as to keep the inclination of the outlet within the chamber to a minimum.

I claim:

1. An air cleaner for contacting air with a cleaning liquid, comprising: a tank; a cleaning liquid contained in said tank and having an upper surface within said tank; an extensible feed tube having an outlet within said tank; means for drawing air through said feed tube; means for maintaining said outlet substantially at the surface of said cleaning liquid; and at least one vertically disposed sheet positioned and arranged with respect to said outlet and extending into said cleaning liquid surface to separate said outlet into plural chambers for stabilizing the outlet over the liquid.

2. The air cleaner of claim 7, wherein said feed tube is divided at its outlet end into plural tubes, each communicating with one of said chambers.

3. The air cleaner of claim 7, wherein said means for maintaining the outlet at the level of the cleaning liquid comprises means for floating the outlet at the surface of the cleaning liquid.

4. The air cleaner of claim 8, wherein said means for maintaining the outlet at the level of the cleaning liquid comprises means for floating the outlet at the surface of the cleaning liquid.

5. The air cleaner of claim 7, 8, 9, or 10 wherein said outlet has a peripheral skirt having circumferentially spaced indentations along the lower margin thereof.

* * * * *

UNITED STATES PATENT AND TRADEMARK OFFICE
CERTIFICATE OF CORRECTION

PATENT NO. : 4,304,739
DATED : December 8, 1981
INVENTOR(S) : John Thorne

It is certified that error appears in the above—identified patent and that said Letters Patent is hereby corrected as shown below:

Column 2, Claim 2, Line 52, "Claim 7" should read --Claim 1--

Column 2, Claim 3, Line 55, "Claim 7" should read --Claim 1--

Column 2, Claim 4, Line 59, "Claim 8" should read --Claim 2--

Column 2, Claim 5, Line 63, "Claims 7, 8, 9 or 10" should read --Claims 1, 2, 3 or 4--

Signed and Sealed this

Fourteenth Day of September 1982

[SEAL]

Attest:

GERALD J. MOSSINGHOFF

*Attesting Officer*     *Commissioner of Patents and Trademarks*